United States Patent
Surazski et al.

(12)

(10) Patent No.: US 6,754,342 B1
(45) Date of Patent: Jun. 22, 2004

(54) METHOD AND APPARATUS FOR CONCEALING MUTE IN AN IP-BASED TELEPHONY SYSTEM

(75) Inventors: Luke Surazski, Santa Clara, CA (US); Michael Knappe, Sunnyvale, CA (US); Pascal Huart, Bedford, TX (US)

(73) Assignee: Cisco Technology, Inc., San Jose, CA (US)

(*) Notice: Subject to any disclaimer, the term of this patent is extended or adjusted under 35 U.S.C. 154(b) by 457 days.

(21) Appl. No.: 09/629,025

(22) Filed: Jul. 31, 2000

(51) Int. Cl.[7] .............................................. H04M 1/00
(52) U.S. Cl. ...................................................... 379/421
(58) Field of Search ........................ 379/421, 202.01; 370/352, 516

(56) References Cited

U.S. PATENT DOCUMENTS 5,506,954 A * 4/1996 Arshi et al. ............. 379/202.01
6,504,838 B1 * 1/2003 Kwan ........................ 370/352

* cited by examiner

Primary Examiner—Jack Chiang
(74) Attorney, Agent, or Firm—Sierra Patent Group, Ltd.

(57) ABSTRACT

A method and apparatus for improving the mute function of an IP telephone is disclosed, where the method comprises determining, by a transmitting IP telephone, whether the mute function has been activated; and if the mute function has been activated, then providing, a predetermined output. Various aspects of the method are disclosed, including: an aspect where the predetermined output is characterized by the absence of silence as detected by an RX unit when the mute function of a TX unit is activated; an aspect where the predetermined output comprises a signal in which voice information has been removed; and an aspect where the removing of voice information is performed by an audio filter disposed within the TX unit of an IP telephone.

11 Claims, 9 Drawing Sheets

Present Invention

Present Invention

Present Invention

Present Invention

Present Invention

Present Invention

Present Invention

Present Invention

METHOD AND APPARATUS FOR CONCEALING MUTE IN AN IP-BASED TELEPHONY SYSTEM

BACKGROUND OF THE INVENTION

1. Field of the Invention

The present invention relates to telephony. In particular, the present invention relates to concealing the mute function in an IP-based telephony system.

2. The Prior Art

BACKGROUND.

The widespread acceptance and use of the Internet has generated much excitement, particularly among those who see the Internet as a possible substitute for the traditional telephone system. As the backbone of the Internet continues to be upgraded and expanded, the promise of a low-cost substitute to the traditional PBX system may now be realized.

One type of Internet-based telephony system that is gaining acceptance is IP telephony, which transfers voice information over the Internet Protocol (IP) of the TCP/IP protocol suite. While many standards exist, such as Voice over Packet (VOP) for Frame Relay and ATM networks, as used herein the term "IP telephony" will be used to designate voice over any packet-based network. In IP telephony, a user wishing to communicate uses an IP telephone, which is a device which transports voice over a network using data packets instead of the traditional switched circuits of a voice only network.

FIG. 1 shows an IP telephony system 100 of the prior art. System 100 includes a business system 102 configured to provide IP telephony in an enterprise environment. Business system 102 may include a network 104, such as a corporate Ethernet LAN, to which a plurality of IP telephones 106 may be operatively coupled to network 104 using hardware and software standard in the art. To couple the business system 102 to the outside world, typically a gateway 108 standard in the art is provided and operatively coupled between network 104 and backbone network 110.

Backbone network 110 may be any packet-based network standard in the art, such as IP, Frame Relay, or ATM. To provide voice communications to legacy POTS phones, typically a gateway 112 is provided, which may be a VoP gateway. Gateway 112 provides access to the Public Switched Telephone Network (PSTN) 114. Through PSTN 114, voice-only communications may be provided to legacy POTS phones 116.

The system 100 of FIG. 1 also includes an example of a broadband residential system 118. To reach individual residences, typically local ISP providers provide a cable or DSL head end 120 standard in the art. An individual wishing to utilize the ISP's service may then employ a cable modem or DSL modem 122 coupled to the user's home LAN 124. The user's home LAN may be provided by a home PC 126 configured to run software standard in the art such Microsoft Windows®. The user may then operatively couple an IP telephone 128 to the LAN 124.

Thus, in the system 100 of FIG. 1, IP telephones 106 in business system 102 may communicate by voice with other similar business systems similarly configured with IP telephones. For a business enterprise, communication by IP telephony may be advantageous because the need for a traditional PBX system can be eliminated. Furthermore, an IP telephony system is scalable and may be upgraded along with the enterprise's network system.

Likewise, the residence of system 118 may communicate by voice to a POTS phone 116 using IP telephone 128. From the view of the home user, the communication of FIG. 1 is advantageous because the communication operates over the backbone network 110 without accessing traditional long-distance service providers.

FIG. 2 is conceptual block diagram of a prior art IP telephone system 200 including a TX unit 202 of a transmitting IP telephone standard in the art and a RX unit 204 of a receiving IP telephone standard in the art. TX unit 202 and RX unit 204 are shown operatively coupled to each other through a network cloud 216. For the sake of clarity, elements of a typical IP telephone not essential to the explanation of the present invention are not shown in the disclosure.

TX unit 202 includes a microphone 206 coupled to a mute switch 207. The mute switch is toggled by a mute user input 227 which may consist of a physical button or softkey on the IP telephone. Mute switch 207 couples the input audio stream to a Voice Activity Detector (VAD) 208, a silence indication packet generator 212 and an encoder 214. VAD 208, encoder 214, and silence indication packet source 212 are operatively coupled to each other to provide an output for transmission over network 216.

In a typical operation, voice information is received on microphone 206 and presented to mute switch 207. If the mute function of the IP telephone is not engaged through the mute user input 227 (i.e., the mute is off) the mute switch 207 will be closed, and the voice information will be presented to the VAD 208, the encoder and the silence indication packet source 212.

Using methods known in the art, the VAD 208 will determine whether there is voice activity present in the signal coming from microphone 206. If there is voice activity in the signal, the switching logic will pass the output of the encoder (i.e., a packet stream) for transmission to network cloud 216 using methods standard in the art.

If the VAD 208 determines that there is no voice activity present on the signal coming from microphone 206, then the switching logic 210 will send one or more silence indications packets to network cloud 116. The silence indication packets contain at least a background noise level so that the comfort noise generator 218 on the receive side can generate noise similar in level and character to the actual background noise on the transmit side.

As is known by those skilled in the art, in some IP telephony systems, a user may disable the VAD of their IP telephone. In such a situation, only background noise can be sent, since silence indication packets can no longer be sent. As used herein, background noise will be used to designate either real background noise, or comfort noise, depending on how the IP telephone is configured.

Comfort noise is a prior art solution to save network bandwidth. The prior art methods determined that if there is no voice activity present, then no voice packets should be sent over the network. However, this results in a unnatural silence appearing on the receiving unit, since no packets are being sent. As a result, the prior art methods developed the concept of comfort noise, which presents the listener with generated noise designed to mimic the line noise of traditional legacy telephones when there is no voice activity present. The comfort noise reassures listeners that their connection is still active.

Referring still to FIG. 2, RX unit 204 includes a comfort noise generator 218 operatively coupled to a decoder 220.

The comfort noise generator 218 and decoder 220 are both operatively coupled to switching logic 224. When the output of TX unit 202 has been transmitted over network 216, it will be received by RX unit 204, and presented to a decoder 220 and a comfort noise generator 218 using methods standard in the art.

If the switching logic receives an encoded voice packet it routes it to the decoder which then outputs the decoded audio signal tot the speaker 226. If the switching logic receives a silence indication packet it routes it the comfort noise generator 218 which then generates comfort noise to the speaker 226 until further voice packets are received. Typically, the CF comprises white or pink noise.

While the systems of FIGS. 1 and 2 perform well for there intended purpose, some disadvantages have been encountered when compared to legacy phone systems. For example, some users of IP telephones have reported inconveniences when using the mute function of an IP telephone.

Referring back to FIG. 2, when the mute function is engaged (i.e., the mute is turned on), mute switch 207 will be open. In prior art systems, the switching logic 210 will sense the opening of mute switch 207, and cease to send voice packets or CF packets over the network. Thus, no information will be transmitted over the network, resulting in silence appearing on the receiving unit. Switching logic 210 may also send CF packets which contain pure silence indication due to the opening of switch 207. Since this silence does not have any voice information or CF noise present, listeners may perceive that the line has gone dead or that they have been disconnected.

FIG. 3 is a prior art conceptual diagram showing IP telephony data flow received by a receiving unit when the mute function is engaged on a transmitting unit. The blocks of FIG. 3 represents the information present during time intervals T1 through T5.

In time interval T1, the receiving unit may be receiving voice information while engaging in a conversation. When the conversation quiets down, the receiving unit may then receive background noise in time interval T2. If the transmitting parties engage the mute function of the transmitting unit, the receiving unit will then hear the background noise disappear and be replaced by silence during time interval T3. After the transmitting party disengages the mute function of the transmitting unit in time interval T4, background noise will reappear. Finally, the conversation may resume in time interval 5, and the receiving unit will again hear voice information. Thus, the listening parties utilizing IP telephones of the prior art will perceive silence when the transmitting parties engage the mute function of their IP telephones. This interval of silence has certain disadvantages, including the perception by the receiving party that the connection has been lost, as well as the uncomfortable feeling the results from knowing the other party is censoring the conversation.

Hence there is a need for a method and apparatus to eliminate the silence that occurs when the mute function of an IP telephone is engaged.

BRIEF DESCRIPTION OF THE INVENTION

The invention satisfies the above needs. The present invention relates to telephony. In particular, the present invention relates to concealing the mute function in an IP-based telephony system.

A method and apparatus for improving the mute function of an IP telephone is disclosed, where the method comprises determining, by a transmitting IP telephone, whether the mute function has been activated; and if the mute function has been activated, then providing, a predetermined output.

Various aspects of the method are disclosed, including: an aspect where the predetermined output is characterized by the absence of silence as detected by an RX unit when the mute function of a TX unit is activated; an aspect where the predetermined output comprises a signal in which voice information has been removed; and an aspect where the removing of voice information is performed by an audio filter disposed within the TX unit of an IP telephone.

Additional aspects of the present invention is disclosed where the predetermined output is comfort noise, and where the act of providing comfort noise is performed by a mute switch disposed within the switching logic of a TX unit of an IP telephone.

By using IP telephones configured according to the present invention, listeners will not experience the silence which is heard in IP telephones of the prior art when the mute function is activated.

BRIEF DESCRIPTION OF THE DRAWING FIGURES

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

It is contemplated that the present invention may be embodied in various computer and machine readable data structures. Furthermore, it is contemplated that data structures embodying the present invention will be transmitted across computer and machine-readable media, and through communications systems by use of standard protocols such as those used to enable the Internet and other computer networking standards.

The invention further relates to machine-readable media on which are stored embodiments of the present invention. It is contemplated that any media suitable for storing instructions related to the present invention is within the scope of the present invention. By way of example, such media may take the form of magnetic, optical, or semiconductor media.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

Figure 1:
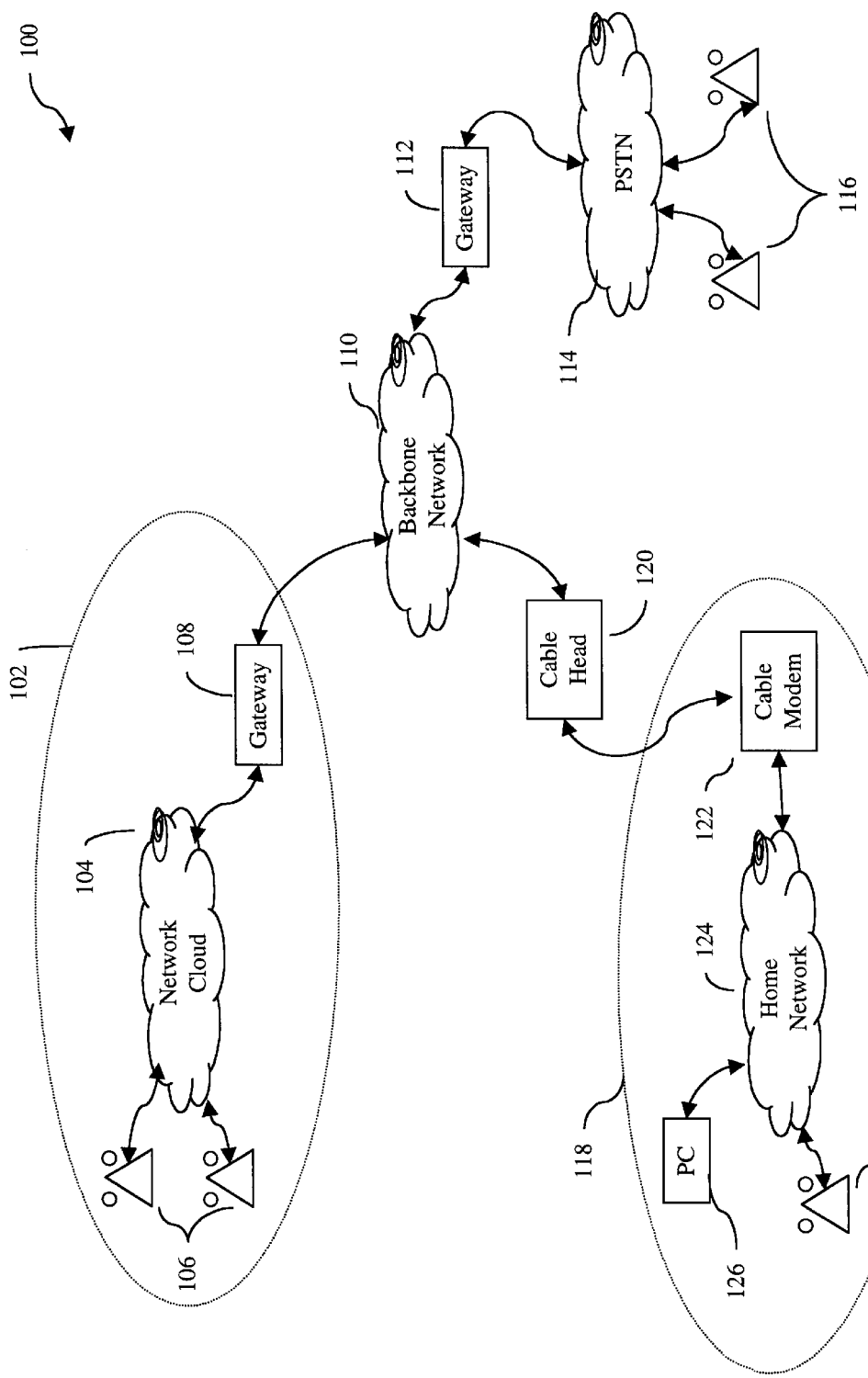
FIG. 1 is a prior art diagram of an IP telephone communications system.
Figure 2:
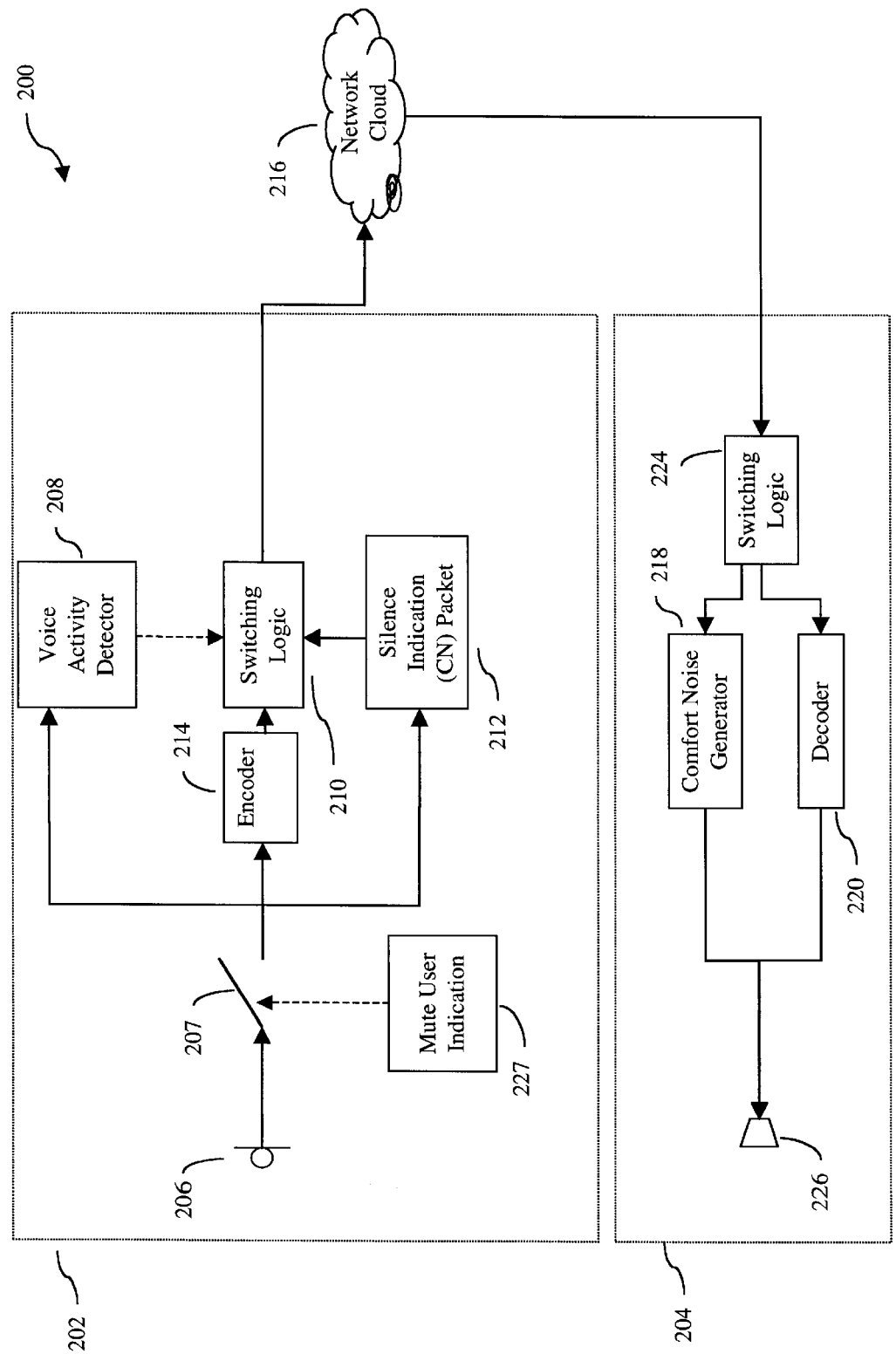
FIG. 2 is a prior art detailed diagram of an IP telephone communications system.
Figure 4:
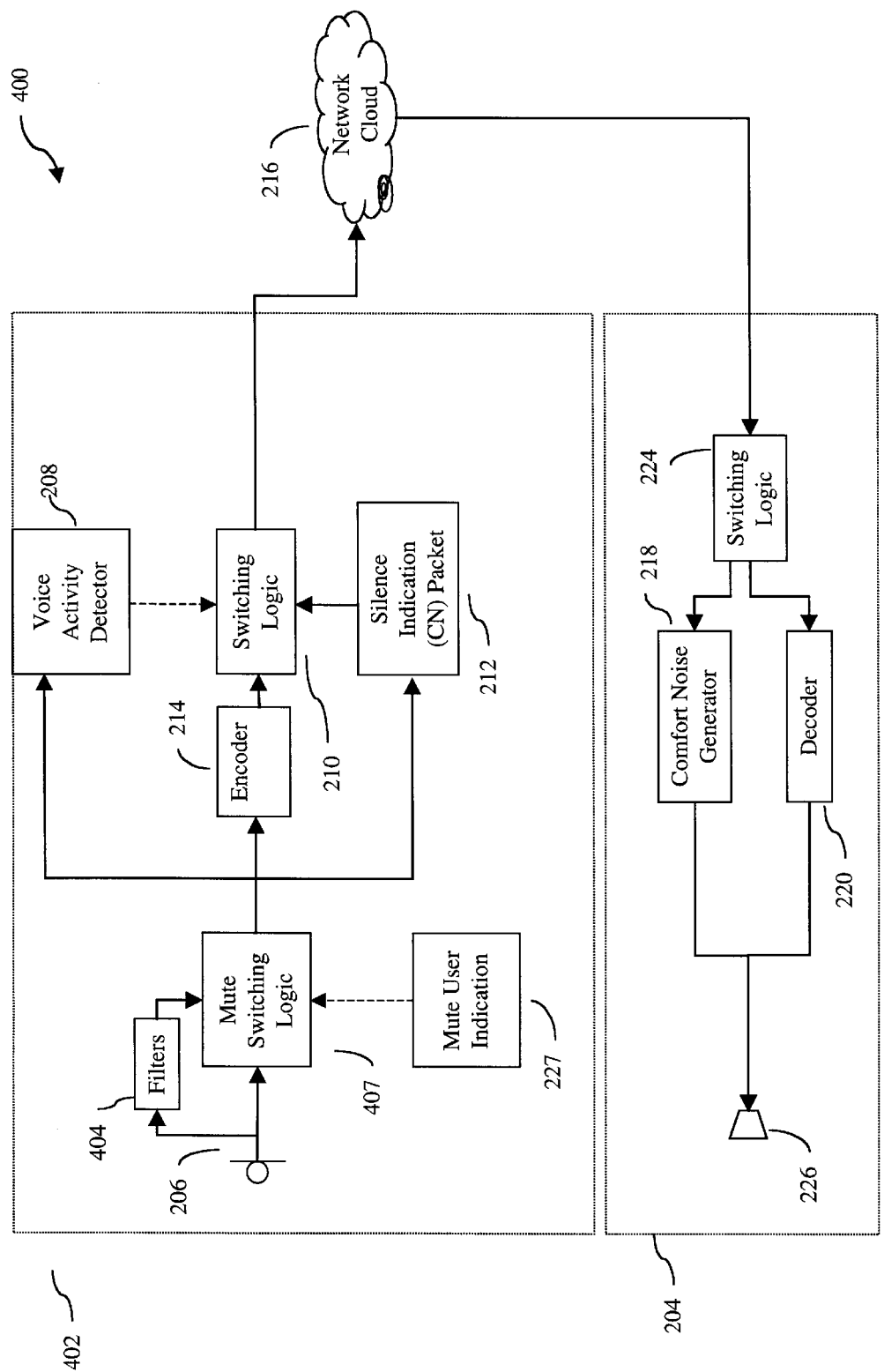
FIG. 4 is detailed diagram of an IP telephone communications system according to the present invention.

FIG. 4 shows a first aspect of an improved mute function according to the present invention. FIG. 4 shows a IP telephony system 400, further including a TX unit 402 configured according to the present invention and operatively disposed within an IP telephone. Where structure is substantially similar to that of FIG. 2, it has been similarly designated. In the embodiment of FIG. 4, a filter 404 is operatively coupled to mute switching logic 407 and microphone 206. In an exemplary non-limiting embodiment, filter 404 comprises an audio filter configured to remove voice activity from the signal provided by microphone 206.

It is contemplated that audio filter 404 may comprise a variety of forms. For example, audio filter 404 may comprise one or more filters configured to filter out speech information and let room noise (non-speech information) pass through. The audio filter 404 may also comprise one or more audio filters configured to precisely filter out the active speaker and pass all else.

Also, audio filter 404 may comprise a filter which tracks the average background noise level and generates random noise, such as white or pink noise, at a corresponding level.

It should be noted that the output generated by audio filter 404 may not represent the final output to the receiver. For example, in one embodiment, audio filter 404 may generate an out-of-band signal encoded to enable the receiving unit to generate a corresponding final output with a particular characteristic.

In an exemplary non-limiting embodiment of the present invention, filter 404 comprises a low pass digital filter. Such a filter is configured using methods known in the art to allow audio at frequencies below those encountered in human speech to pass through unaffected while removing or rendering inaudible all audio in the frequencies typically associated with human speech. For example, such a filter might have a stop-band at 60 Hz. The disclosure above regarding filter 404 provides an example of means for removing voice information from a signal.

Additionally, mute switching logic 407 is configured to pass the output of microphone 206 or filter 404 depending on the setting of mute user indication 227. The mute switching logic 407 operatively couples the output of the microphone 206 and the output of the filter block 404 to the input of the VAD 208, encoder 214 and silence indication packet source 212. If the mute function is disabled the output of the microphone 206 will be selected by the mute switching logic 407 as the input to the VAD 208, encoder 214 and silence indication packet source 212. If the mute function is enabled the output of the filter block 404, the voiceless signal, will be selected by the mute switching logic 407 as the input to the VAD 208, encoder 214 and silence indication packet source 212. In an exemplary non-limiting embodiment of the present invention, mute switching unit is configured to direct the output of either microphone 206 or filter 404 to a particular memory space in the TX unit of an IP telephone. Mute switching logic 407 may comprise hardware and software standard in the art.

Figure 5:
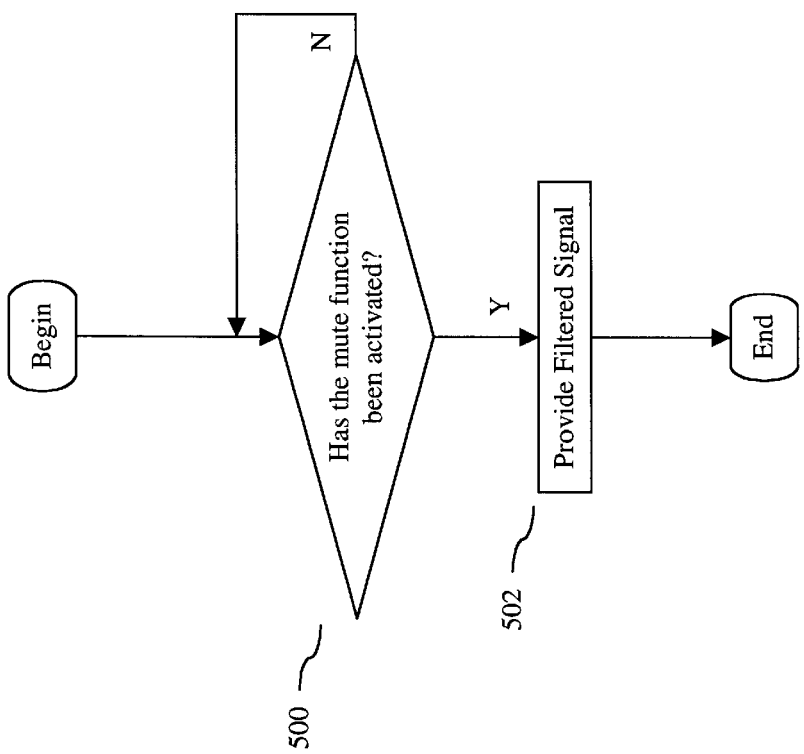
FIG. 5 is a flowchart of one aspect of the present invention.

Referring now to FIG. 5, a flowchart of one preferred method for improving the mute function according to the present invention is shown. The process of FIG. 5 begins with query 500, where the TX unit determines whether the mute function of the TX unit has been activated. If the mute function is activated or engaged, the present invention will provide a predetermined output. In an exemplary non-limiting embodiment of the present invention, if the mute function has been activated, then the present invention will remove the voice information from the signal in act 502 using the filter 404 of FIG. 4.

If the mute function has not been activated, then the IP telephone will operate normally in query 500.

Figure 3:
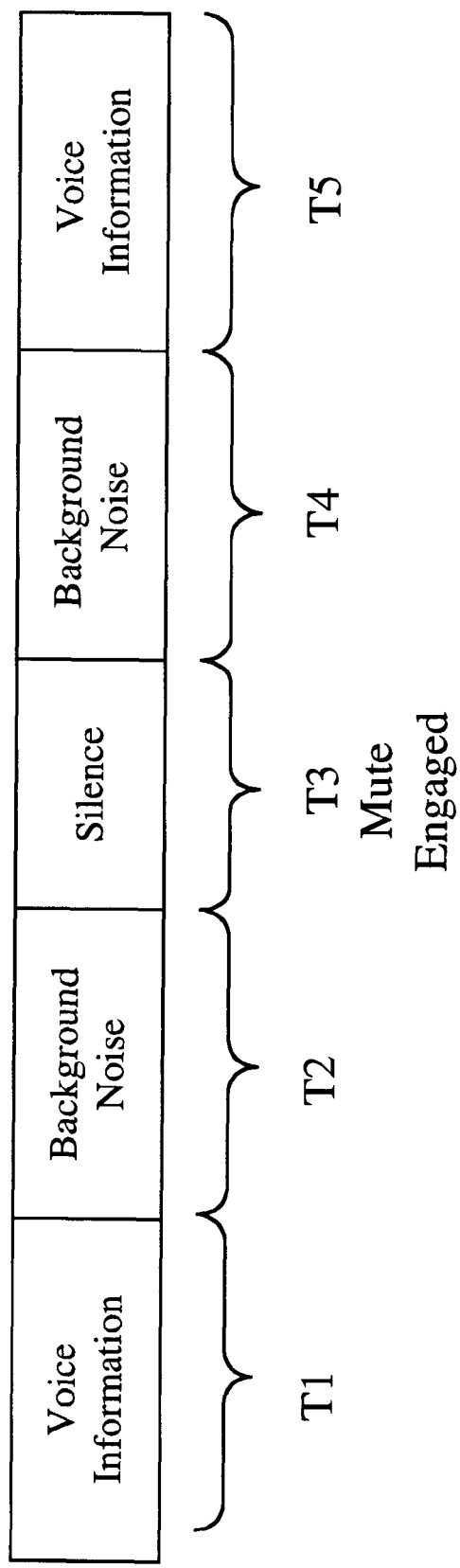
FIG. 3 is a prior art diagram of IP telephony data flow received by a receiving unit when the mute function is engaged on a transmitting unit.
Figure 6:
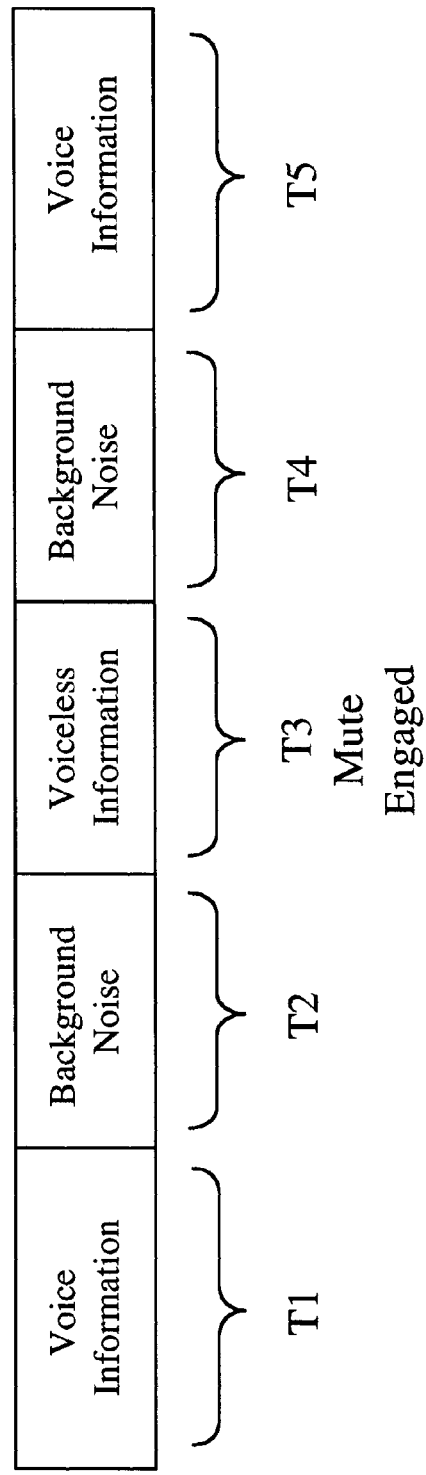
FIG. 6 is a diagram of IP telephony data flow received by a receiving unit when the mute function is engaged on a transmitting unit according to the present invention.

FIG. 6 is a conceptual diagram showing data flow according to one aspect of the present invention. FIG. 6 represents the scenario shown in FIG. 3, but highlights the results achieved by the present invention. It should be noted that the sequence of events shown in FIG. 6 and other similar figures is but one example and is provided for illustrative purposes only, and many different sequences are possible within the scope of the present invention.

The blocks of FIG. 6 represent the information transmitted by a TX unit, and received by a RX unit, during time intervals T1 through T5.

In time interval T1, the receiving unit may be receiving voice information while engaging in a conversation. When the conversation quiets down, the receiving unit may then receive background noise in time interval T2.

If the transmitting parties engage the mute function of the transmitting unit, the receiving unit will then hear voiceless information during time interval T3, i.e., background noise with the voice information filtered out according to the present invention.

After the transmitting party disengages the mute function of the transmitting unit in time interval T4, background noise will reappear. Finally, the conversation may resume in time interval 5, and the receiving unit will again hear voice information.

It should be noted that the data transmission according to the present invention may be characterized by the absence of silence during the time interval that the mute function is enabled.

Thus, the listening parties utilizing IP telephones according to the present invention will not hear the silence during time interval T3 which was present in IP telephones of the prior art.

Figure 7:
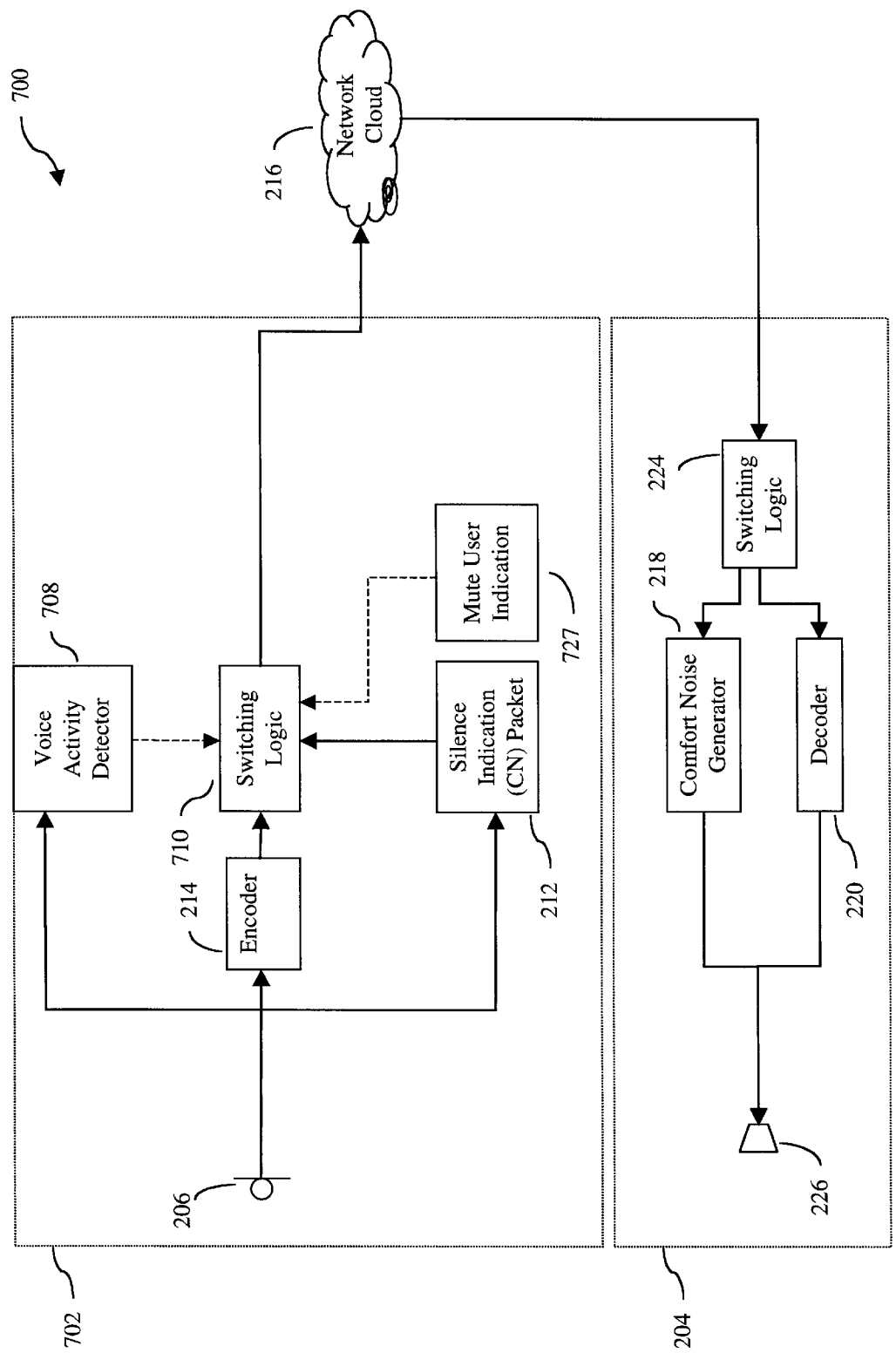
FIG. 7 is detailed diagram of an IP telephone communications system according to the present invention.

FIG. 7 is a block diagram of a second aspect of an improved mute function according to the present invention. FIG. 7 shows a IP telephony system 700, further including a TX unit 702 configured according to the present invention. Where structure is substantially similar to that of FIG. 2, it has been similarly designated.

FIG. 7 incorporates the mute switch into the switching logic 710 by coupling the mute user indication 727 to the switching logic 710. In an exemplary non-limiting embodiment of the present invention, the mute switching logic 710 is configured to provide comfort noise when the mute user indication 727 is activated. In a presently preferred embodiment, TX unit 702 is configured such that when a user enables the mute feature, switching logic 710 will provide silence indication packets to be transmitted over the network 216. This will cause comfort noise to be generated by the RX unit 204 when the mute function is engaged, rather than silence as in IP telephones of the prior art. Furthermore, by incorporating the mute switch into the switching logic, it is possible to repeatedly send silence indication packets to the RX unit 204 at regular intervals. By sending silence indication packets at regular intervals to the RX unit 204 the comfort noise generated at the RX unit 204 will more closely follow the background noise at the TX unit 702. This will ensure that the switch back to comfort/background noise is less noticeable when the mute function is deactivated via the mute user indication 727.

Figure 8:
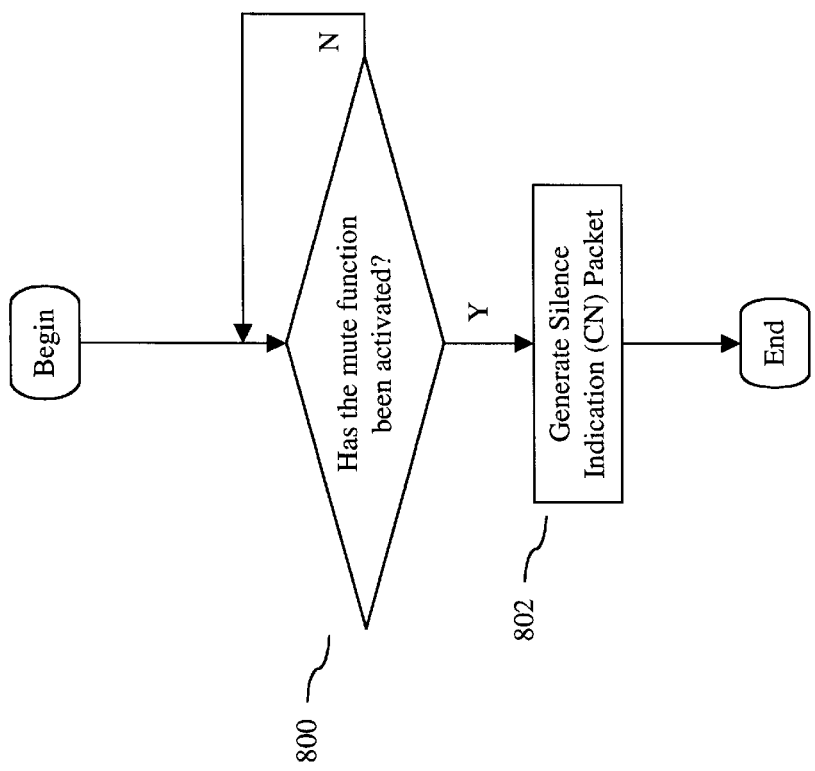
FIG. 8 is a flowchart of another aspect of the present invention.

Referring now to FIG. 8, a flowchart of another preferred method for improving the mute function according to the present invention is shown. The process of FIG. 8 begins with query 800, where the TX unit determines whether the mute function of the TX unit has been activated. In an exemplary non-limiting embodiment of the present invention, if the mute function has been activated, then the present invention will generate comfort noise packets in act 802. In yet another exemplary non-limiting embodiment of the present invention, the present invention will send silence indication packets at regular intervals in act 802.

If the mute function has not been activated, then the IP telephone will operate normally in query 800.

Figure 9:
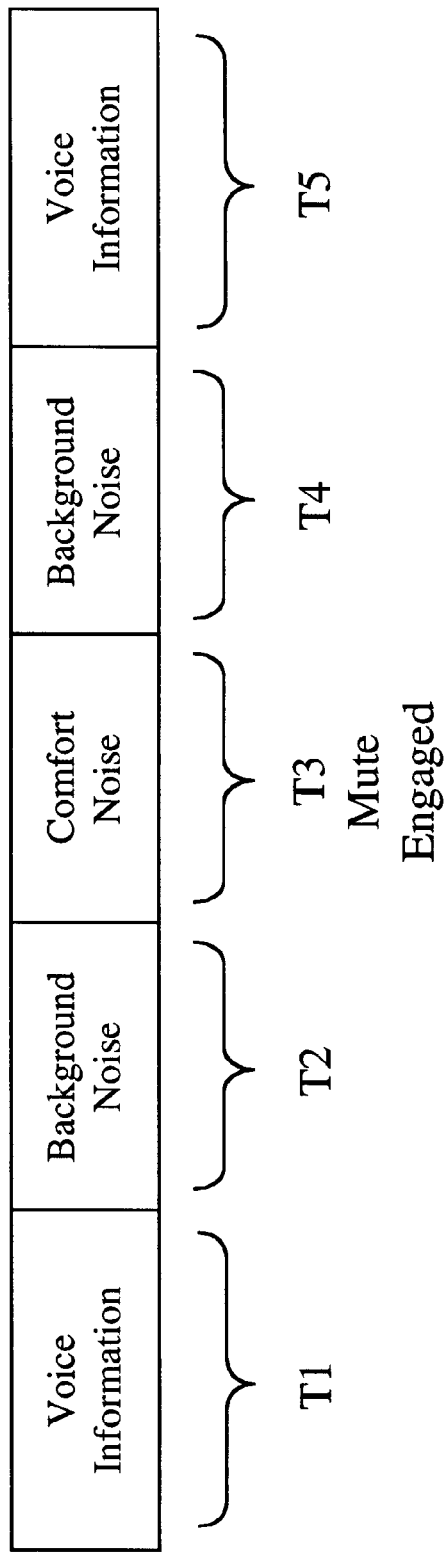
FIG. 9 is a diagram of IP telephony data flow received by a receiving unit when the mute function is engaged on a transmitting unit according to another aspect of the present invention.

FIG. 9 is yet another conceptual diagram showing data flow according to a further aspect of the present invention. FIG. 9 also represents the scenario shown in FIG. 3, but highlights the results achieved by the present invention.

The blocks of FIG. 9 represent the information transmitted by a TX unit, and received by a RX unit, during time intervals T1 through T5.

In time interval T1, the receiving unit may be receiving voice information while engaging in a conversation. When the conversation quiets down, the receiving unit may then receive background noise in time interval T2.

If the transmitting parties engage the mute function of the transmitting unit, the receiving unit will hear comfort noise during time interval T3.

After the transmitting party disengages the mute function of the transmitting unit in time interval T4, background noise will remain. Finally, the conversation may resume in time interval 5, and the receiving unit will again hear voice information.

It should be noted that the data transmission according to the present invention may be characterized by the presence of comfort noise during the time interval that the mute function is enabled.

Thus, the listening parties utilizing IP telephones according to the present invention will not hear the silence during time interval T3 which was present in IP telephones of the prior art.

It should be apparent to those skilled in the art that various aspects of the present invention may be combined to provide a less noticeable and more effective mute algorithm. For example, by coupling the filters 404 to the audio signal from the microphone 206 when the mute signal is activated, the silence indication packet source 212 will be able to more accurately measure the background noise levels at the TX unit 702.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for concealing a mute function for an Internet Protocol telephone, said method comprising:

receiving an input requesting a mute function;

receiving incoming audio signals; filtering said incoming audio signals remove voice audio signals to produce voiceless audio signals responsive to receiving said input requesting said mute function wherein said voiceless audio signals comprise audio signals of comfort noise in the absence of said voice audio signals;

generating transmission packets from said voiceless audio signals; and transmitting said transmission packets.

2. The method of claim 1 wherein said step of generating said transmission packet comprises:

generating silence indication packets.

3. The method of claim 1 wherein said step of generating said transmission packets comprises:

inserting said voiceless audio signals into said transmission packets responsive to said filtering of said voice signals.

4. The method of claim 3 wherein said step of filtering comprises the step of:

applying said incoming audio signals to an audio filter configured to remove voice signals.

5. The method of claim 1 wherein said step of generating said transmission packets comprises:

generating signals of comfort noise; and inserting said signals of comfort noise into said transmission packets.

6. The method of claim 5, wherein said step of generating said comfort noise is performed by a mute switch disposed within the switching logic of a TX unit of an IP telephone.

7. An Internet Protocol telephone that conceals a mute function, said Internet Protocol telephone having a transmitting unit operatively disposed within said Internet Protocol telephone, wherein said transmitting unit includes a microphone, a mute switch, a voice activity detector, and switching logic operatively coupled together within said transmitting unit, said Internet Protocol telephone comprising:

a filter, in said transmitting unit operatively coupled to said microphone, said mute switch, said voice activity detector, and said switching logic, wherein said filter removes voice audio signals from received audio signals to generate voiceless audio signals responsive receiving a mute signal in said switching logic; and circuitry configured to transmit packets including audio data generated from said voiceless audio signals.

8. A program storage device readable by a machine, tangibly embodying a program of instructions executable by the machine to perform a method for concealing the mute function of an Internet Protocol telephone, said method comprising:

receiving a mute signal from a user;

applying incoming audio signals to a voice filter that removes voice signals to generate voiceless audio signals responsive to receiving said voice;

generating audio data wherein said audio data defines outgoing audio signals with an absence of voice signals in said outgoing audio signals;

generating transmission packets including said audio data; and transmitting said transmission packets to a receiving Internet Protocol telephone.

9. The storage device of claim 8, wherein said audio data defines said outgoing audio signals having noise.

10. The storage device of claim 8, wherein said audio data defines said outgoing audio signals having background noise.

11. The storage device of claim 8, wherein said audio data defines said outgoing audio signals having comfort noise.

* * * * *